Dec. 1, 1964  J. F. HOAG ETAL  3,159,077
FILM FRAME VIEWER WITH ADJUSTABLE GATE ASSEMBLY
Filed April 2, 1962  5 Sheets-Sheet 1
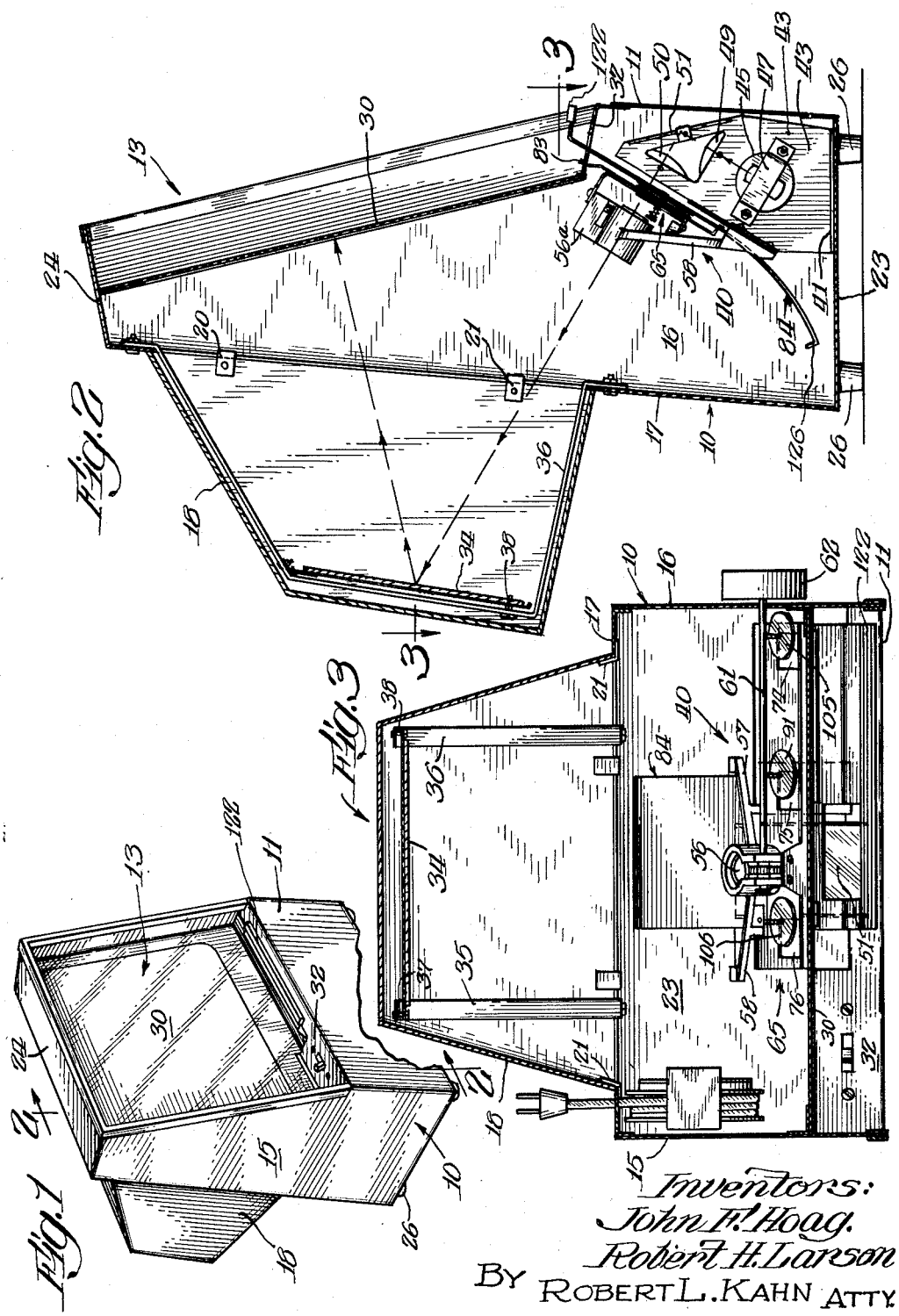
Inventors:
John F. Hoag,
Robert H. Larson
BY ROBERT L. KAHN ATTY.

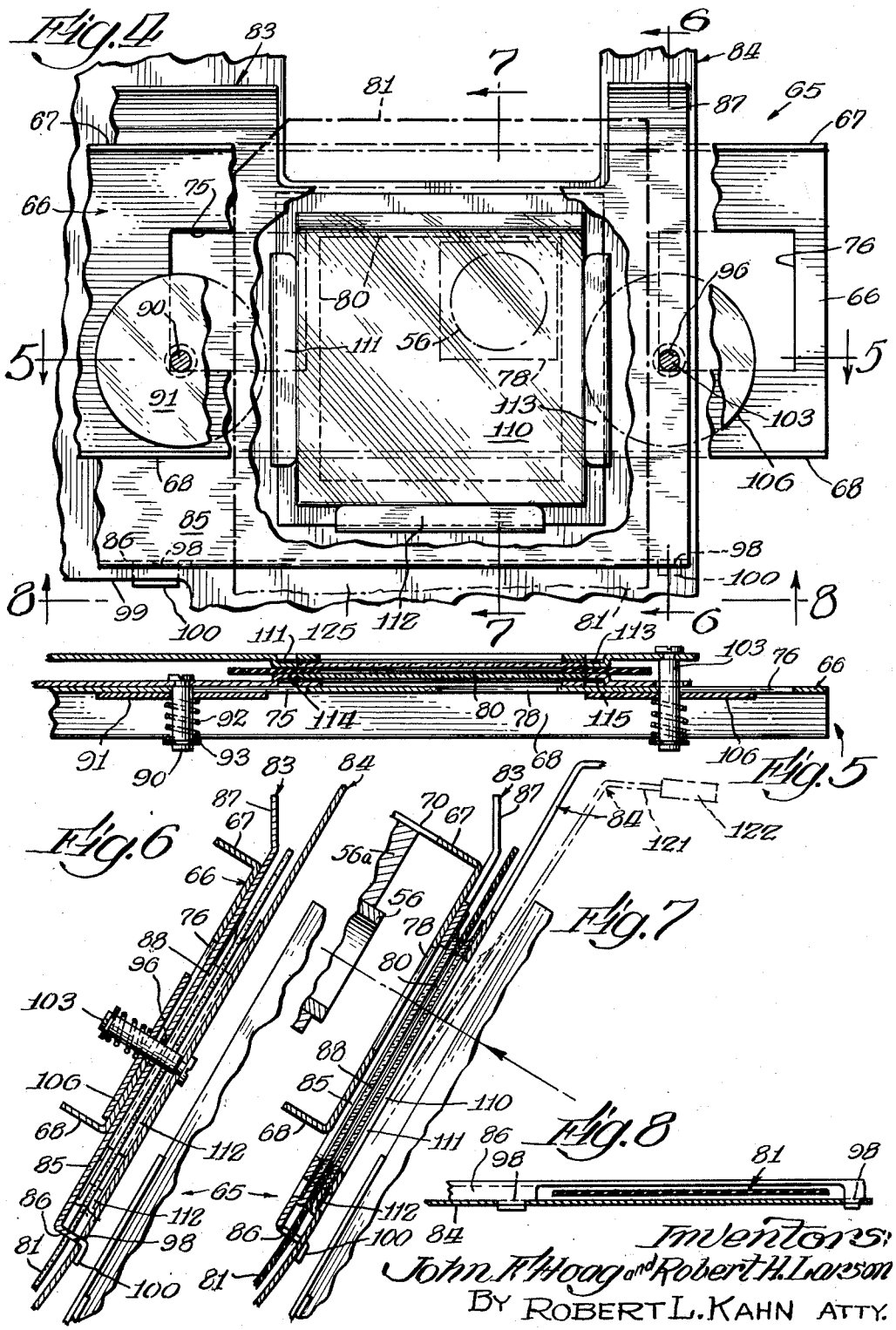

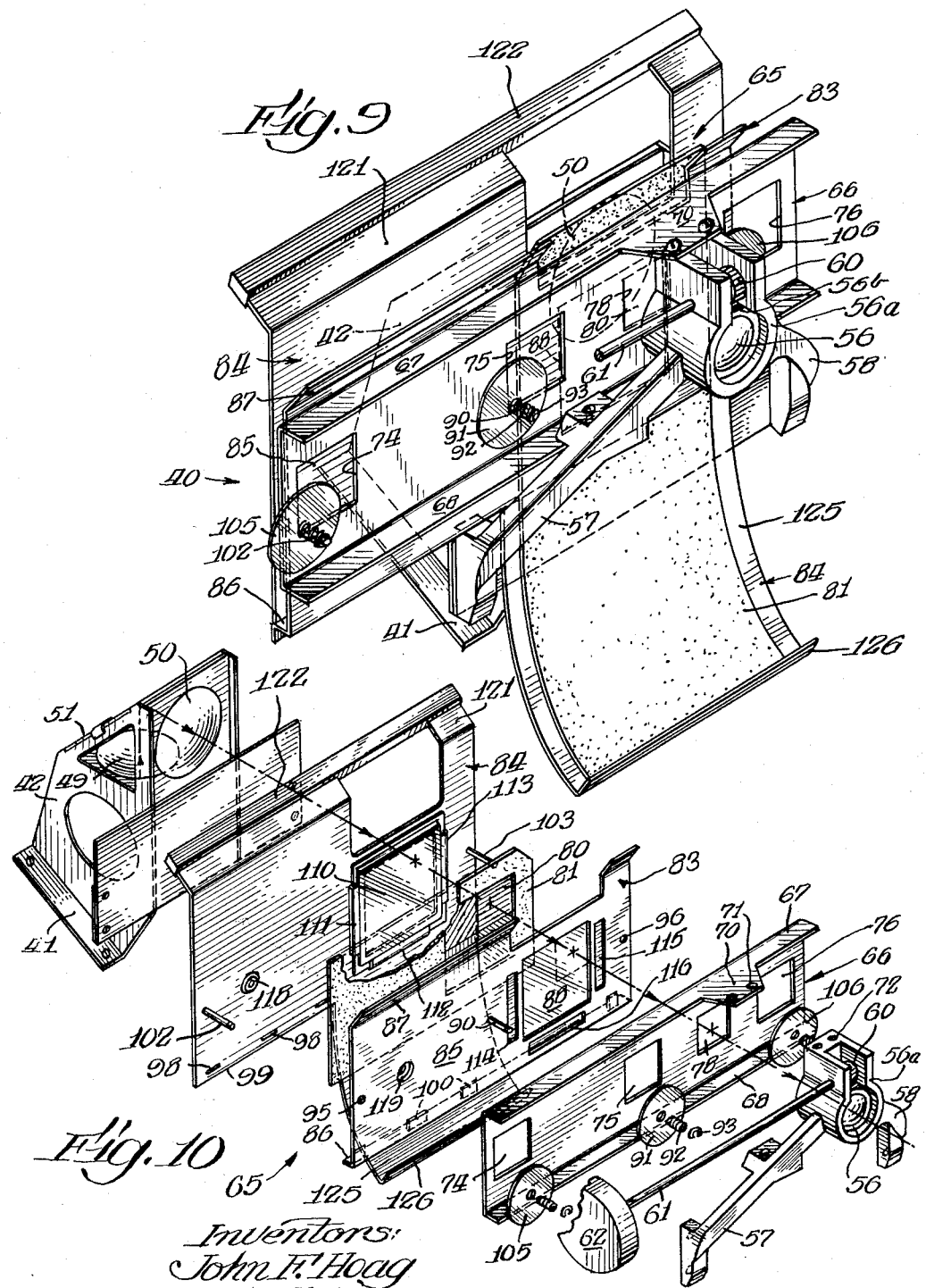

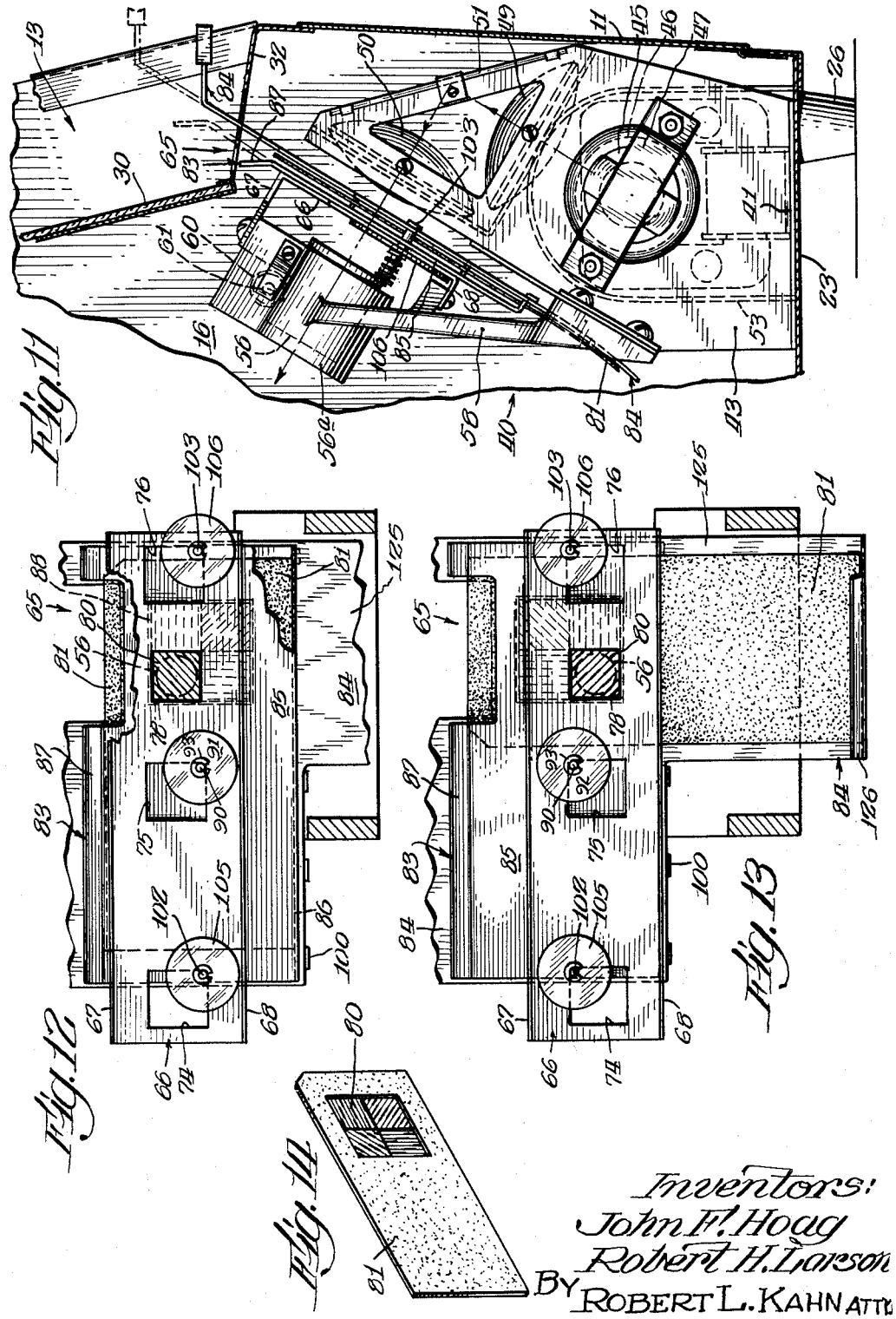

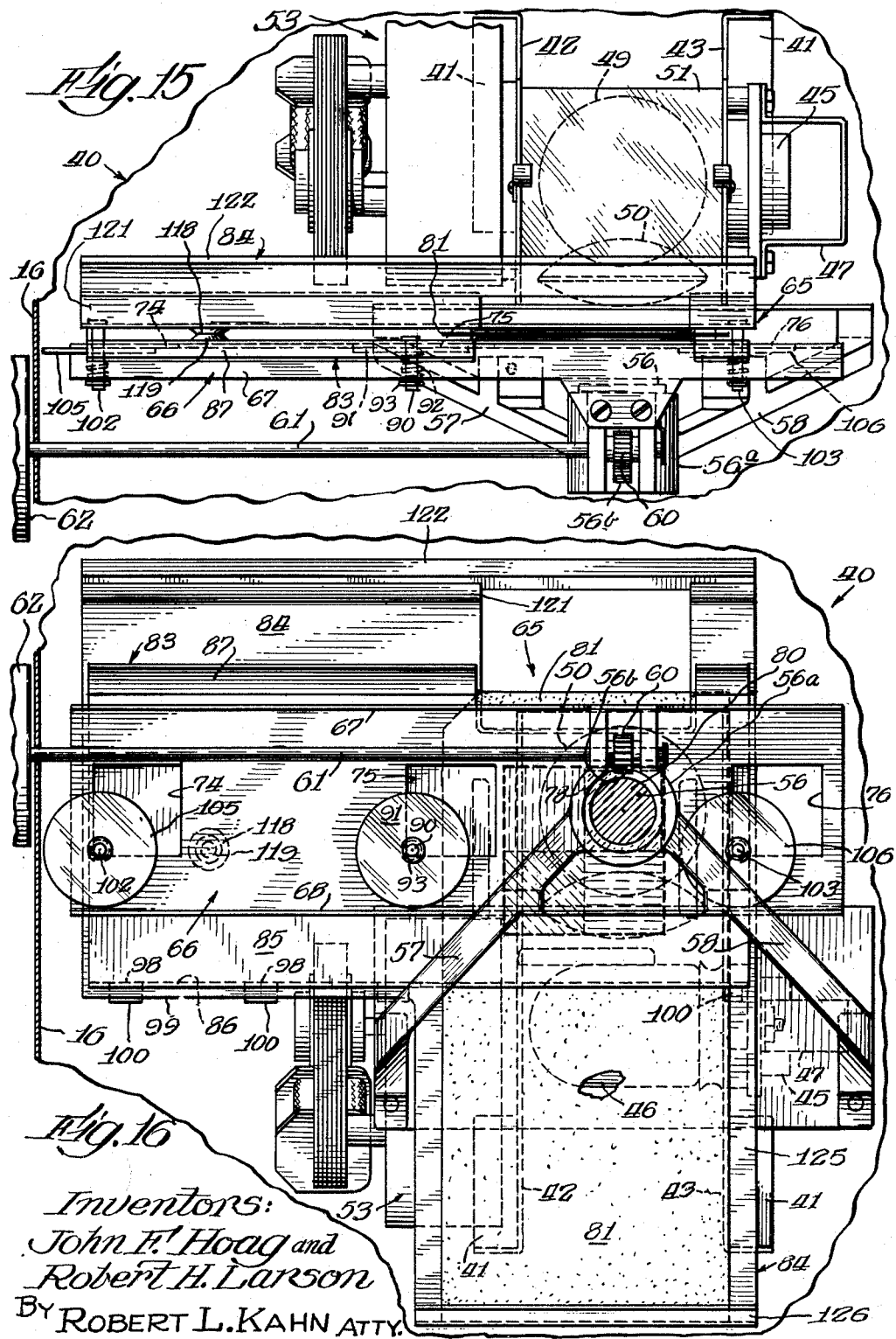

United States Patent Office 3,159,077
Patented Dec. 1, 1964

3,159,077
FILM FRAME VIEWER WITH ADJUSTABLE
GATE ASSEMBLY
John F. Hoag and Robert H. Larson, Batavia, Ill., assignors to Dukane Corporation, St. Charles, Ill., a corporation of Delaware
Filed Apr. 2, 1962, Ser. No. 184,203
4 Claims. (Cl. 88—24)

This invention relates to a viewer, and more particularly to a viewer for exhibiting enlarged images of selected areas of a film. It is common practice to record drawings or other material on small film frames, such a procedure generally being referred to as microfilm. While such a procedure makes it possible to store large quantities of record material in a small space, a problem has arisen in connection with a convenient means for viewing such record material.

Viewers for accommodating film frames are well known. The film frames are usually small, customarily being the frames of standard 35 mm. motion picture film. As a rule, such viewers may be small portable boxes wherein a single frame is accommodated and may be viewed on a screen. Such viewers can be used by a comparatively small group of people, four or five people at the most, and do not require any special accommodations.

The viewers so far available for use with such film frames have generally operated on the entire frame and have thrown a magnified image of such frame upon a small screen. It is clear that the amount of magnification of such a device is severely limited unless the physical dimensions of the viewer and the screen are increased to values which may make the same unwieldy. In order to avoid this, a selected portion of the frame can be used at any one time insofar as viewing the same is concerned. In such case, the person using the viewer must move the card containing the film frame to select the desired portion thereof for viewing. A few viewers of this type have been available, but the construction thereof has made it difficult to use and has limited the selection of areas to be viewed. In addition, the construction of such viewers has been expensive and has involved complexities which have limited the effectiveness thereof.

This invention provides a viewer for operating on any desired portion of a complete film frame having great flexibility insofar as the use thereof is concerned. In addition, the new viewer is characterized by simple construction and does not require any particular technique insofar as the use thereof is concerned.

An exemplary embodiment of the present invention will now be disclosed in connection with the drawings wherein:

FIGURE 1 is a perspective showing of a viewer embodying the present invention.

FIGURE 2 is a section on line 2—2 of FIGURE 1.

FIGURE 3 is a section on line 3—3 of FIGURE 2.

FIGURE 4 is an enlarged detail with certain parts broken away.

FIGURE 5 is a section on line 5—5 of FIGURE 4.

FIGURES 6, 7 and 8 are sections on lines 6—6, 7—7 and 8—8 respectively of FIGURE 4.

FIGURE 9 is a perspective showing of the frame holding part of the viewer.

FIGURE 10 is an exploded view of the frame holding part of the viewer.

FIGURE 11 is an enlarged side elevation of the light source and frame holder.

FIGURES 12 and 13 are views with certain parts in section showing two positions of a frame in the holder.

FIGURE 14 is a perspective view of a card and frame for use in the viewer.

FIGURE 15 is a top view somewhat similar to FIGURE 3 but taken from a different position and shown on a larger scale.

FIGURE 16 is a greatly enlarged view of the holder in the viewer.

The viewer as a whole includes housing 10 of any suitable material, such as wood or fiber, containing front panel 11, above which is easel-shaped viewing window 13. Housing 10 has sides 15 and 16 and rear panel 17. Projecting outwardly from rear panel 17 is hood 18. Hood 18 is of thin fiber or wood and is attached to rear panel 17 by small metal angle irons 20 and 21. Housing 10 includes bottom 23 and top 24. The entire viewer may be supported on feet 26 extending from the bottom to raise the viewer a small distance above a support such as a table.

Mounted in easel window 13 is projection screen 30 of glass or any other suitable material adapted to receive a projected image on the back surface thereof and to permit viewing from the front through the screen. Screen 30 is supported in a suitable manner along sides 15 and 16 of the housing and top 24, and at the bottom of the screen is supported at shelf 32. The screen is preferably supported at a suitable angle so that a person sitting in front of the viewer can look at the image projected onto the screen comfortably. If desired, the screen may be supported in such a manner as to permit adjustment of the angle. Viewers having screens of this character are well known, and accordingly, the details of the support of the screen are not important and need not be disclosed.

The projected image falling upon the back of screen 30 is reflected from mirror 34 supported at the rear of hood 18. Mirror 34 is supported in any suitable fashion, such as by metal straps 35 and 36, and the support is so designed that adjusting screws 37 and 38 for supporting the mirror on the straps will permit some adjustment of the angle of mirror 34. Mirror 34 may conveniently consist of a flat sheet of chromium plated metal or a piece of glass suitably mirrored and having metal straps cemented thereto at the edges. The adjustment for the mounting of mirror 34 is such that when the entire assembly is completed and disposed within the housing, mirror 34 may be adjusted to throw the enlarged image on screen 30 correctly.

The image falling on mirror 34 is projected thereon by projection unit generally indicated by 40, now to be described. Projection unit 40 is carried by metal base plate 41 suitably supported on bottom 23 of the housing. Base plate 41 forms part of a housing having sides 42 and 43. Mounted in side 43 is socket 45 for supporting incandescent lamp 46. The socket and lamp may be detachably secured at side 43 and removed by handle 47. Supported between sides 42 and 43 are two components 49 and 50 of a condensing lens system, these two components having their axes perpendicular. Condenser components 49 and 50 cooperate with mirror 51 supported between sides 42 and 43. The arrangement is such that light from incandescent lamp 46 passes through lens 49 to mirror 51, thence through lens 50 on mirror 34. The beam from lens 50 passes through a magnifying lens system, to be described. Light from incandescent lamp 46 may be augmented by a mirror disposed in back of the incandescent lamp.

In order to maintain the lamp and lens system cool, a motor driven blower, generally indicated by 53, is carried by the housing, as for example, at side 42. The blower has an air intake and exhausts into the housing within which the lamp and condensing lenses 49 and 50 are disposed. The details of the light system are not important insofar as the present invention is concerned and it is understood that the light source and reflecting system may be changed if desired.

The beam of light after passing through exit lens 50 of the condensing system is directed on and passes through a film gate, to be described. After passing through the film gate, the light beam continues through lens barrel 56 within which a magnifying lens system of conventional design is disposed. Lens barrel 56 is supported for longitudinal movement in fixture 56a carried by arms 57 and 58 of a casting rigidly secured to the frame of the light system. Lens barrel 56, together with the lenses therein, can be moved for focusing purposes longitudinally in fixture 56a through rack 56b extending longitudinally of the barrel and rigidly attached thereto, the rack being engaged by pinion 60. Pinion 60 is disposed on rod 61 journaled for rotation in fixture 56a. Rod 61 extends through side 16 of the viewer housing and carries knob 62 at the free end thereof. Knob 62 can be turned to focus a film frame upon screen 30.

The film gate previously referred to is a complete assembly, generally indicated by 65. The gate assembly includes stationary plate 66 having top and bottom flanges 67 and 68 extending forwardly. Stationary plate 66 extends horizontally in the normal position of the viewer and is secured to a part of the entire viewer for support. As illustrated in the drawings, plate 66 is supported by extension 70 forming part of top flange 67. Extension 70 is attached by screws passing through suitable apertures 71 in extension 70 and engaging tapped recesses 72 in fixture 56a. Stationary plate 66 is provided with three clearance windows 74, 75 and 76 arranged horizontally along the length of plate 66. Clearance windows 74 to 76 inclusive are each rectangular and are substantially similar in size. Between clearance windows 75 and 76 is beam window 78, this window being normally in line between the lens system in barrel 56 and exit lens 50 of the light source. Beam window 78 is large enough to accommodate the desired light beam passing to the lenses in barrel 56. Beam window 78 may have any desired shape and is here shown as rectangular with the window dimensions being smaller than the dimensions of film frame 80 carried by card 81.

The relative sizes of beam window 78 and film frame 80 will depend upon the amount of movement provided for the film frame relative to beam window 78. Merely by way of example, beam window 78 is here shown as being a bit larger than one-fourth of the rectangular shape of film plate 80. As will be understood after the mechanism has been fully described, the ratio of areas of beam window 78 and film frame 80 can be anything desired and it is not even necessary that the beam window or film frame have the same shape or be rectangular.

Supported on stationary plate 66 in a manner to permit lateral movement normal to the light beam is a sub-assembly consisting of a forward gate plate 83 and rear gate plate 84. Forward gate plate 83 comprises body portion 85 with rearwardly extending flange 86 at the bottom and forwardly extending flange 87 at the top. Bottom flange 86 extends at right angles to body 85 while top flange 87 extends back at an acute angle. Forward plate 83 has window 88 which is at least as large as film frame 80. Forward plate 83 also carries pin 90 riveted thereto and extended forwardly. When forward plate 83 is disposed against the rear face of stationary plate 66, pin 90 will pass through clearance window 75. Pin 90 accommodates larger washer 91 and coil spring 92. Washer 91 is larger than clearance window 75 and can not go through the clearance window. Washer 91 is disposed against stationary plate 66 so that the washer is separated from forward gate plate 83 by plate 66. Coil spring 92 is threaded over the pin and C washer 93 is positioned in an annular slot at the end of pin 90 to lock the coil spring and washer in position. There is enough play provided by the coil spring to permit some separation of gate plate 83 from stationary plate 66. Gate plate 83 is provided with apertures 95 and 96 at the end thereof, these two apertures and pin 90 being disposed in a straight line. The spacing is such that apertures 95 and 96 can appear at clearance windows 74 and 76 when pin 90 passes through clearance window 75.

Cooperating with forward gate plate 83 is rear gate plate 84. Rear gate plate 84 has slots 98 disposed along the bottom edge 99 thereof. Slots 98 register with tongues 100 extending down from the end of flange 86 of plate 83. Tongues 100 can enter slots 98 to provide a hinge lock for the bottom of the two gate plates. Rear gate plate 84 carries pins 102 and 103 extending forwardly therefrom and spaced to register with apertures 95 and 96 of gate plate 83. Pins 102 and 103 can pass through clearance windows 74 and 76 and each carries large washers 105 and 106 provided with individual coil springs and C washers.

Rear gate plate 84 has window 110 provided with a glass cover maintained in position by plate deformations 111, 112 and 113 along the sides and bottom thereof. The glass and tongues project forwardly from the surface of plate 84. Forward plate 83 has clearance openings 114 and 115 for accommodating tongues 111 and 113. Plate 83 also has plate deformation 116 below the bottom of window 85 for cooperating with plate deformation 112 of plate 84.

The arrangement of the plates is such that plates 66, 83 and 84 can all be positioned as illustrated in FIGURES 5 to 8 inclusive with the plates disposed against each other. The glass for window 110 in plate 84 may be somewhat larger than window 88 for plate 83 so that plates 83 and 84 can not be pressed too snugly against each other. Means for preventing plates 83 and 84 from approaching too closely at the ends remote from the windows are provided. Such means consist of embossings 118 and 119 extending toward each other on plates 83 and 84 respectively and adapted to engage to space the plates apart. Rear plate 84 has top portion 121 extending rearwardly. Top portion 121 of plate 84 and top portion 87 of plate 83 extend away from each other to provide lips for promoting the insertion of card 81 carrying the film frame. Top portion 121 of plate 84 carries handle portion 122 at the edge thereof, this handle portion extending upwardly and being readily accessible in the bottom of screen 30 from the top of the viewer. For convenience, the body of plates 83 and 84 is cut away above the respective windows to accommodate the fingers or a person inserting or removing card 81 from the gate.

The dimensions of gate portions 83 and 84 and the spacing of pins 102 and 103 is such that card 81 will be accommodate along its length and the upper portion of the card will be at the cut-out regions for these plates. It will be noted that card 81 has one corner clipped for orientation, the card itself having a generally rectangular shape. Such cards are in common use and the location of the corner makes it easy for a person to position the card properly. When the card is properly positioned in the gate, frame 80 of the card will register with windows 110 and 88 of gate plates 84 and 83 respectively. Handle portion 122 can be operated to move gate plates 83 and 84 and card 81 in the general plane of the card. It will be apparent that pins 102 and 103 and pin 90 in plate 83 should all register with clearance windows 74, 75 and 76, and preferably these pins should be so oriented that the movable gate holder part and card will be allowed to have a maximum range of movement up and down or sideways so that entire frame 80 of card 81 may be successively exposed to the light passing through. By proper design of the various parts, the entire area of frame 80 may be accomodated, the actual exposure being limited to a part of the field. The arrangement of washers 105 and 106 and 91 is such that irrespective of the position of the movable gate sub-assembly containing the card, it will be impossible to accidentally disassemble the gate, since the large washers will always extend beyond the edges of the respective clearance windows. The spring and washer arrangement will permit sufficient play so that the gate sub-assembly consisting of plates 83 and 84 can be moved or manipulated easily to position any desired part of frame 80 for viewing.

To accommodate card 81 in a different position so that the length of the card is in a generally vertical direction, gate plate 84 has downwardly extending portion 125 terminating in flange 126, this portion being disposed just below window 110 of the plate. This portion may be curved as illustrated and is so dimensioned that card 81 may if desired be inserted at right angles to the position illustrated in FIGURE 10. Frame 80 may then be viewed at right angles to the position illustrated in FIGURE 10.

It will be apparent that the entire gate mechanism is simple and consists of sheet material, preferably of sheet steel, which may be easily stamped and shaped. Plate 66 is sufficiently wide between top and bottom flanges 67 and 68 to permit washers 91, 105 and 106 to move freely in all directions within the limits defined by the boundaries of clearance windows 74, 75 and 76. It will be readily understood that the clearance windows need not necessarily be rectangular. It is apparent that the movable gate sub-assembly consisting of plates 83 and 84 can assume a tilted position if desired, with the frame being at such a position that the dimensions of the frame do not necessarily extend parallel to the dimensions of stationary plate 66. In other words, there is no particular reason why card 81 can not be tilted to an angle from the horizontal or vertical position, as the case may be.

The entire gate consisting of the stationary plate and movable sub-assembly may be readily applied to various kinds and types of viewers, it being only necessary to support plate 66 on some suitable stationary part and to have the various beam windows of the gate disposed in the path of light between a light source and a screen.

While three washers and clearance windows have been illustrated for controlling the movement of the gate sub-assembly with respect to the stationary gate plate, this number may be varied. Thus two clearance windows may be used and it is even possible to rely upon one clearance window alone, although such an arrangement would be far from sturdy. It is also possible to have the three clearance windows arranged so that they are not in line as illustrated. However, the linear arrangement of the clearance windows make for maximum flexibility insofar as adjustment is concerned. A non-linear arrangement of the clearance windows would reduce the range of movement of the gate part containing the frame.

It is possible to have some or all of clearance windows 74, 75 and 76 on gate plate 83 instead of stationary plate 66. In such case, plate 66 would carry the pins and washers. Such an arrangement would be less desirable for the reason that the clearance windows, pin and washers would have to be located beyond the area where interference with card 81 would be possible. The present arrangement permits pins 102 and 103 to function as card guides. It is possible for pins 102 and 103 to be carried by plate 83.

It is also possible to have the movable sub-assembly consist of only one plate with spring clips for holding the frame. Thus plate 83 may be eliminated, in which case pin 90 would be omitted. If plate 84 is eliminated, then pins 102 and 103 would be carried by plate 83.

What is claimed is:

1. In a film frame viewer having a light source providing a beam of light going to a viewing screen, a gate assembly for holding a film frame in an adjustable position for disposing any desired part of said film frame in the light path for viewing, said gate assembly including a plate for fixed mounting on said viewer, said plate having a window in the light path for defining a film frame area to be viewed, at least one movable plate, means carried by said movable plate for supporting said film frame thereon, said movable plate having a window, said second named window being larger than said first named window and being in the light path to accommodate the entire film frame, and means for mounting said movable plate on said stationary plate to permit said movable plate to move perpendicular to the light path over a range great enough to dispose any desired part of the film frame in the light path, said mounting means including at least one pin carried by one plate and extending through an enlarged clearance window in the other plate and a spring pressed washer carried by said pin and being larger than said clearance window, said washer and said one plate being on opposite sides of said other plate, with the clearance window being large enough to permit said pin to be moved laterally so that the entire film frame is subject to viewing, the means for mounting said movable plate being laterally clear of the film frame viewing windows.

2. The construction according to claim 1 wherein said means for mounting said movable plate on said stationary plate includes three windows and three pins with each pin having a spring pressed washer cooperating with the corresponding window, said three windows being disposed in a straight line and said three pins being disposed in a straight line so that said pins may be moved laterally in their respective windows.

3. In a film frame viewer having a light source providing a beam of light going to a viewing screen, a gate assembly for holding a film frame in an adjustable position for disposing any desired part of said film frame in the light path for viewing, said gate assembly including as a component a plate for fixed mounting on said viewer, said plate having a window in the light path for defining a film frame area to be viewed, a movable gate sub-assembly as another component comprising two plates for supporting said film frame therebetween, means for securing said two plates forming said movable sub-assembly so that said two plates may be opened or closed to receive or maintain a film frame therebetween, said sub-assembly plates having windows which are larger than the first named window and being in the light path to expose the entire film frame and means for mounting said sub-assembly on said stationary plate for relative movement thereto perpendicular to the light path over a range great enough to dispose any desired part of the film frame in the light path, said mounting means including at least one pin carried by one of said components and extending through an enlarged clearance window in the remaining component and a spring pressed washer carried by said pin and being larger than said clearance window, said washer and the one plate component carrying the pin being on opposite sides of the remaining plate component having the clearance window, with the clearance window being large enough to permit said pin to be moved laterally in said window over a sufficient range for complete coverage of the film frame, said securing means for the two plates forming said sub-assembly including tongues and slots adjacent the edges of said two plates and cooperating to maintain said two plates in lateral alignment with the spring pressed washer tending to urge said two plates together but permitting some opening movement for accommodating a film frame, said pin and washer and co-operating window means being laterally clear of the viewing windows.

4. The construction according to claim 3 wherein at least two windows with pins and spring pressed washers are provided, the plate in the sub-assembly nearest the light source carrying the pins with the second plate of the sub-assembly having apertures therethrough for permitting said pins to pass through with substantially minimum clearance and wherein said clearance windows are provided in the first named plate, said pins being spaced far enough apart to function as guides in connection with supporting the film frame in the movable sub-assembly.

References Cited in the file of this patent

UNITED STATES PATENTS

| | | |
|---|---|---|
| 2,174,194 | Nemnich | Sept. 26, 1939 |
| 2,246,920 | Kromholz | June 24, 1941 |
| 2,498,278 | Kaplowitz | Feb. 21, 1950 |